(12) United States Patent
Carmichael (10) Patent No.: US 7,996,788 B2
(45) Date of Patent: Aug. 9, 2011

(54) SYSTEM AND METHOD FOR NAVIGATING A DYNAMIC COLLECTION OF INFORMATION

(75) Inventor: Chris Carmichael, Laguna Niguel, CA (US)

(73) Assignee: International Apparel Group, LLC, Laguna Niguel, CA (US)

( * ) Notice: Subject to any disclaimer, the term of this patent is extended or adjusted under 35 U.S.C. 154(b) by 295 days.

(21) Appl. No.: 11/436,400

(22) Filed: May 18, 2006

(65) Prior Publication Data

US 2007/0271516 A1    Nov. 22, 2007

(51) Int. Cl.
*G06F 3/048* (2006.01)

(52) U.S. Cl. .......................... 715/834; 715/853; 715/854

(58) Field of Classification Search .................. 715/854, 715/853, 834
See application file for complete search history.

(56) References Cited

U.S. PATENT DOCUMENTS

| | | | | |
|---|---|---|---|---|
| 5,515,486 A * | 5/1996 | Amro et al. | ................. | 715/848 |
| 5,524,196 A * | 6/1996 | Blades | ........................... | 715/834 |
| 5,644,736 A * | 7/1997 | Healy et al. | .................... | 715/784 |
| 6,211,921 B1 * | 4/2001 | Cherian et al. | ............... | 348/565 |
| 6,219,053 B1 * | 4/2001 | Tachibana et al. | ........... | 715/835 |
| 6,236,398 B1 * | 5/2001 | Kojima et al. | ................ | 345/419 |
| 6,236,987 B1 * | 5/2001 | Horowitz et al. | ................. | 707/3 |
| 6,448,987 B1 * | 9/2002 | Easty et al. | .................... | 715/834 |
| 6,538,635 B1 * | 3/2003 | Ringot | ........................... | 345/156 |
| 6,549,219 B2 * | 4/2003 | Selker | ........................... | 715/834 |
| 6,628,313 B1 * | 9/2003 | Minakuchi et al. | ........... | 715/853 |
| 6,819,344 B2 * | 11/2004 | Robbins | ........................ | 715/848 |
| 6,918,091 B2 * | 7/2005 | Leavitt et al. | ................. | 715/765 |
| 6,938,218 B1 * | 8/2005 | Rosen | ........................... | 715/850 |
| 7,013,435 B2 * | 3/2006 | Gallo et al. | .................... | 715/850 |
| 7,036,091 B1 * | 4/2006 | Nguyen | ........................ | 715/834 |
| 7,093,201 B2 * | 8/2006 | Duarte | .......................... | 715/853 |
| 7,096,431 B2 * | 8/2006 | Tambata et al. | ............... | 715/834 |
| 7,134,092 B2 * | 11/2006 | Fung et al. | .................... | 715/779 |
| 2002/0075311 A1 * | 6/2002 | Orbanes et al. | ............... | 345/764 |
| 2002/0085037 A1 * | 7/2002 | Leavitt et al. | ................. | 345/765 |
| 2003/0046300 A1 * | 3/2003 | Arai | ......................... | 707/103 R |
| 2003/0167213 A1 * | 9/2003 | Jammes et al. | ................ | 705/27 |
| 2003/0197724 A1 * | 10/2003 | Reed | .............................. | 345/738 |
| 2003/0197740 A1 * | 10/2003 | Reponen | ....................... | 345/810 |
| 2005/0010955 A1 * | 1/2005 | Elia et al. | ........................ | 725/88 |
| 2005/0050476 A1 * | 3/2005 | SanGiovanni | ................ | 715/834 |
| 2006/0090139 A1 * | 4/2006 | Jenni et al. | .................... | 715/760 |
| 2006/0095865 A1 * | 5/2006 | Rostom | ......................... | 715/810 |
| 2006/0279541 A1 * | 12/2006 | Kim et al. | ..................... | 345/158 |

* cited by examiner

*Primary Examiner* — Tuyetlien T Tran
(74) *Attorney, Agent, or Firm* — Law Office of Scott C. Harris, Inc.

(57) ABSTRACT

A graphical user interface is provided that permits the navigation of dynamic collections of information. A simplified presentation allows navigation between multiple levels of information content. Navigating through the various levels of the collection of information causes the information to be recursively presented in a hierarchical fashion. Furthermore, the information content may be dynamic in nature such that changes to the information content or its structure is reflected in the hierarchical presentation. The present invention may be used to navigate collections of information including web sites, computer file systems, databases, and other hierarchical systems.

8 Claims, 10 Drawing Sheets

SYSTEM AND METHOD FOR NAVIGATING A DYNAMIC COLLECTION OF INFORMATION

BACKGROUND

1. Field

The present invention generally relates to graphical user interfaces and more particularly relates to the navigation of dynamic collections of information.

2. Related Art

Navigation through collections of information is firmly rooted in conventional text based solutions. These conventional utilities were well suited to yesterday's low-bandwidth networks and limited processing power devices. In today's high-bandwidth, high processing power environments, however, conventional navigation utilities are increasingly becoming the bottleneck between a user desired information. Additionally, conventional navigation utilities typically present very different user interfaces across the various different types of collections of information. For example, databases, file systems, and web sites all have very different user interfaces, requiring users to be experienced and familiar with each interface.

Furthermore, conventional navigation systems continue to struggle with the presentation of information relating to the location, direction, and context of a user within a collection of information. Compounding this limitation of the conventional systems is the increasingly dynamic nature of collections of information and their tendency and ability to change while a user is interacting with the collection of information.

One significant drawback of conventional navigation systems is that a user can easily get lost within the hierarchical structure of the collection of information. This is typically due to a lack of context presented to the user, but can also be due to variations in the form of the user interface. For example, different graphical presentations of the navigation system may be found within the various web pages in a web site. The different graphical presentation may cause a user to become confused as to the current location with the collection of information.

Therefore, what is needed is a system and method that provides uniform navigation of dynamic collections of information and overcomes the significant problems found in the conventional systems as described above.

SUMMARY

Various systems and methods are presented that provide for the navigation of dynamic collections of information. A unified presentation shows the hierarchical relationship between the multiple levels of information content and allows for the simplified navigation between the levels. Navigating through the various levels of the collection of information causes the information to be recursively presented in a hierarchical fashion. Advantageously, as the information content may change, those changes are reflected in the hierarchical presentation of the structure of the collection of information. The various systems and methods presented may be used to navigate collections of information including web sites, computer file systems, databases, and other hierarchical systems.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for the navigation of dynamic collections of information. For example, one method as disclosed herein allows a dynamic collection of information to be parsed into a dynamic content table that provides a user with the overall context of the collection of information in a simplified navigation system. The overall context can also be recursively updated as the user navigates within the dynamic collection of information, providing the user with a context sensitive road map for use in navigation.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
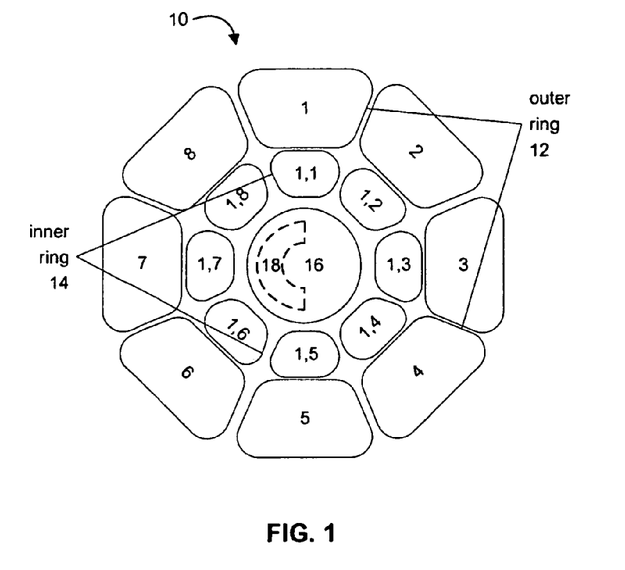
FIG. 1 is a block diagram illustrating a system for navigating a dynamic collection of information according to an embodiment of the present invention.

FIG. 1 is a block diagram illustrating a navigation system 10 for navigating a dynamic collection of information according to an embodiment of the present invention. The illustrated navigation system 10 comprises an outer ring 12, an inner ring 14, and an inner core 16. In the description of the various embodiments herein, the outer ring 12 may also be referred to as the top-level 12, the inner ring 14 may also be referred to as the sub-level 14, and the inner core 16 may also be referred to as the core-level 16. Additionally, the navigation system 10 may comprise more or less rings or levels. For example, certain embodiments of the navigation system 10 may comprise three or four rings in addition to the inner core.

The outer ring 12 has a variable number of elements. For example, in the illustrated embodiment, outer ring 12 has eight elements, numbered 1-8 respectively. Similarly, inner ring 14 has a variable number of elements. The elements of inner ring 12 are context sensitive based on the element of the outer ring 12 that is currently in focus, or currently selected. As illustrated, the inner ring 14 comprises eight elements. Each element in the inner ring is numbered as a tuple, e.g., (X,Y), where the first number (X) represents the outer ring element currently in focus and the second number (Y) represents the number of the inner ring element. For example, an inner ring element with the tuple (2,5) indicates that the second outer ring element is currently in focus in combination with the fifth inner ring element.

Navigation system 10 additionally comprises an inner core 16 that occupies the central portion of the wheel shaped navigation system 10. Additionally, navigation system 10 may have an optional inner core element 18 that is located within or adjacent to the inner core 16. Although the illustrated navigation system 10 is presented in the form of a wheel or a semicircle in the various embodiments herein, it is understood that the scope of the present invention encompasses alternative presentations for the navigation system 10 that include the functionality described herein. As such, reference to a particular graphical presentation or shape of the navigation system 10 in the examples described shall not be construed as limiting.

The function of the navigation system 10 is to provide a simple and consistent interface for navigating through a dynamic collection of information. Dynamic collections of information can include, for example, computer file systems, databases, and of course, web sites. At the granular level, a dynamic collection of information may comprise a number of files, records, or web pages. Additionally, a dynamic collection of information may include files and records and web pages.

Furthermore, dynamic collections of information also comprise an inherent architecture. One particularly important aspect of a dynamic collection of information is that the information in the collection can be modified while it is being used, reviewed, searched, or otherwise accessed. For example, files in a file system can be added, removed, or modified. Similarly, records in a database can be added, removed, or modified and web pages can be added, removed, or modified. These changes to a dynamic collection of information can take place contemporaneously while a user is navigating the collection of information.

Figure 2:
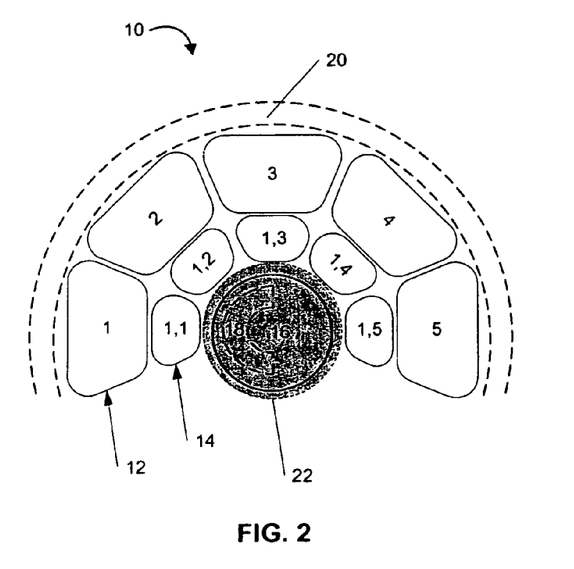
FIG. 2 is a block diagram illustrating an alternative system for navigating a dynamic collection of information according to an embodiment of the present invention.

FIG. 2 is a block diagram illustrating an alternative navigation system 10 for navigating a dynamic collection of information according to an embodiment of the present invention. The illustrated navigation system 10 comprises a top-level 12, a sub-level 14, an inner core 16 and an optional inner core element 18. The navigation system 10 also comprises a text display area 20 and a graphics display area 22, which is emphasized with shading.

The top-level 12 comprises a variable number of top-level elements, illustrated as elements 1-5 respectively. The sub-level 14 similarly comprises a variable number of sub-level elements, illustrated as elements 1,1-1,5 respectively. The elements of sub-level 14 are context sensitive and are instantiated in the navigation system according to which element (1-5) of top-level 12 is currently selected or otherwise in focus.

The text display area 20 arcs around the perimeter of the top-level 12 to provide a maximized linear distance in which to put textual information. Advantageously, an element that is currently selected or that currently has the focus of the navigation system 10 can be described with words in text display area 20. For example an element within the top-level 12, and element within the sub-level 14, the core-level 16, or the optional core-level element 18 may have the focus at any given time.

The text that is presented in text display area 20 may be presented in a variety of ways such as scrolling in from right to left or scrolling in from left to right. Various alternative ways to present and sustain the text in text display area 20 will be readily apparent to those skilled in the art.

The graphics display area 22 is centrally positioned within the navigation system 10 to provide a maximized contiguous area for the display of graphical images or video. In the illustrated embodiment, graphics display area 22 is disposed behind the core-level 16 and the optional core element 18. Alternatively, the core-level 16 and the optional core element 18 may be moved to another location in order to provide an unobstructed view of the graphics display area 22.

The graphics that are presented in graphics display area 22 may be presented in a variety of ways. For example, the graphics may be presented as moving video or as static images. Static images may be constant or they can be cycled such that a series of related images are shown that convey a particular meaning. The function served by displaying text, graphics, or both is to provide an understanding of the content available within the element of the navigation system 10 that is currently selected, or otherwise in focus. Various alternative ways to present and sustain the graphics in graphics display area 22 will be readily apparent to those skilled in the art.

Navigation system 10 may also comprise a speaker (not shown) that allows audio to be provided in addition to the text and graphics in order to increase the understanding of the available content.

Figure 3:
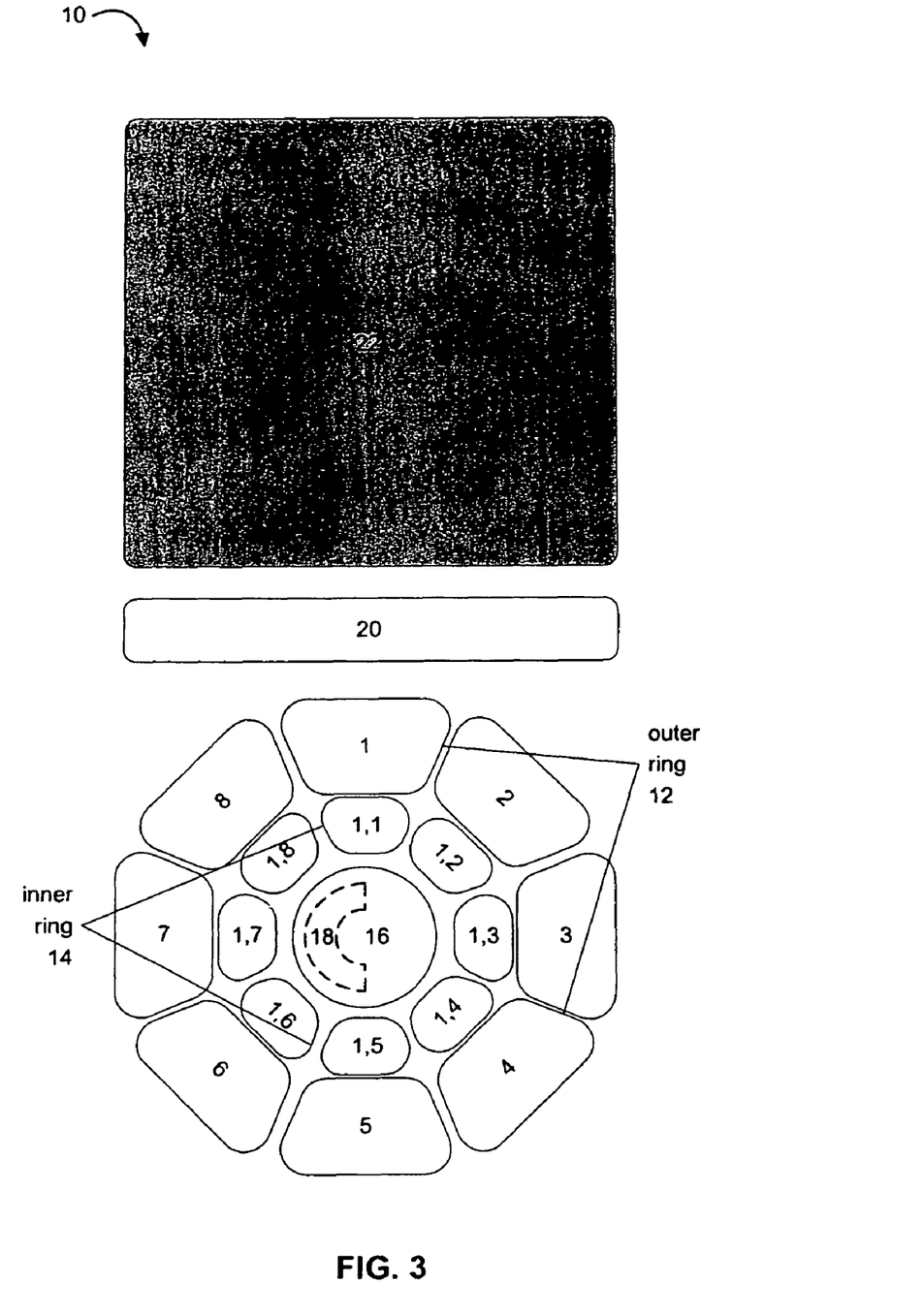
FIG. 3 is a block diagram illustrating another alternative system for navigating a dynamic collection of information according to an embodiment of the present invention.

FIG. 3 is a block diagram illustrating another alternative navigation system 10 for navigating a dynamic collection of information according to an embodiment of the present invention. The navigation system 10 comprises an outer ring 12 and an inner ring 14 as previously described with respect to FIG. 1. Navigation system 10 additionally comprises an inner core 16 and an optional inner core element 18. Furthermore, navigation system 10 comprises a text display area 20 and a graphics display area 22, which is emphasized with shading.

The text display area 20 is disposed above the outer ring 12 to provide a viewable area for textual descriptions of the element that is currently selected. The graphics area 22 is disposed above the text display area 20 to provide a larger viewing area for graphics (images, video, or both) associated with the element that is currently selected. As previously described, the text display area 20 and the graphics display area 22 provide information and clues pertaining to the content that is available within the currently selected or otherwise in focus element of the outer ring 12, inner ring 14, inner core 16, or optional inner core element 18.

Advantageously, the organization of the navigation system 10 as illustrated provides a larger, more conspicuous graphical display area 22. Such an organization may increase the ability of the graphics display area 22 to provide meaningful information related to the available content.

Figure 4:
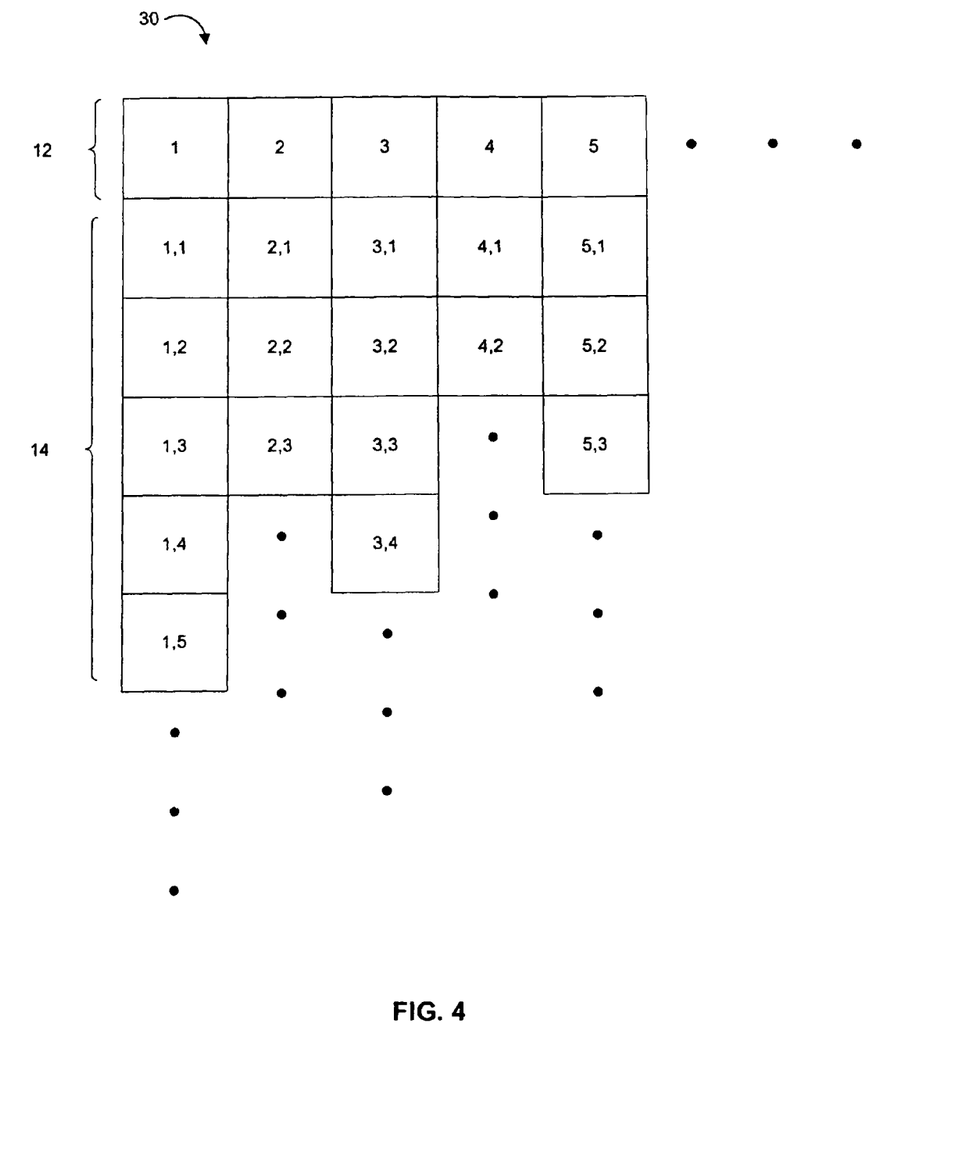
FIG. 4 is a block diagram illustrating a table of dynamic content listings according to an embodiment of the present invention.

FIG. 4 is a block diagram illustrating a table 30 of dynamic content listings according to an embodiment of the present invention. The dynamic content listings in table 30 correspond to the previously described elements of top-level 12 and elements of sub-level 14. For example, the top row of table 30 corresponds to the elements (1-5) of the top-level 12 as described with respect to FIG. 2. The first column of table 30 (excluding the top row element) corresponds to the elements (1,1-1,5) of the sub-level 14 also described with respect to FIG. 2. The additional columns 2-5 correspond to the elements of each respective sub-level present in the dynamic collection of information. Advantageously, the dynamical collection of information can be examined and the resulting relationships stored in table 30.

As indicated by the ellipses extending out from the top row representing the top-level 12 and extending down from each column representing the various sub-levels 14, the number of entries in the top-level 12 (and therefore the number of entries in the top row of table 30) and the number of entries in each sub-level 14 (and therefore the number of entries in each column of table 30) can vary. The respective number of entries varies based on the hierarchical structure inherent in the dynamic collection of information that is being navigated by the navigation system 10.

FIGS. 5A-5E are block diagrams illustrating the various states of a navigation system 10 in conjunction with the table of dynamic content listings shown in FIG. 4. In FIGS. 5A-5E, those elements that are currently selected or otherwise in focus are emphasized with shading, along with the graphics display area 22. Initially, in FIG. 5A, element 1 of top-level 12 is selected. The selection of an element may be carried out in a variety of ways, for example with a mouse-over event or a mouse click on a computer system. Additionally, an element may be selected by use of an input device such as a wand on a personal digital assistant device. Alternatively, an element may be selected by use of a voice command in conjunction with a voice recognition system.

Figure 5A:
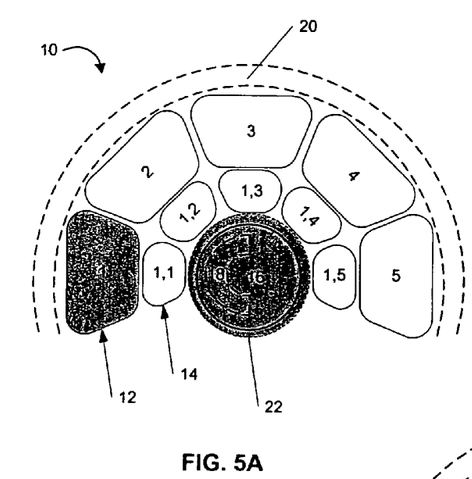
FIGS. 5A-5E are block diagrams illustrating the various states of a navigation system in conjunction with the table of dynamic content listings shown in FIG. 4.

In the navigation system 10, the selection of element 1 of top-level 12 dynamically causes the elements of sub-level 14 to be instantiated with the corresponding elements from table 30. For example, in the illustrated embodiment, element 1 of top-level 12 has five sub-elements (1,1-1,5) respectively. These five sub-elements are instantiated into the elements of sub-level 14 once element 1 of top-level 12 is selected.

Additionally, the selection of element 1 of top-level 12 causes any description in text display area 20, any graphics in graphics display area 22, and any associated audio to be updated according to the content associated with the new selection.

Figure 5B:
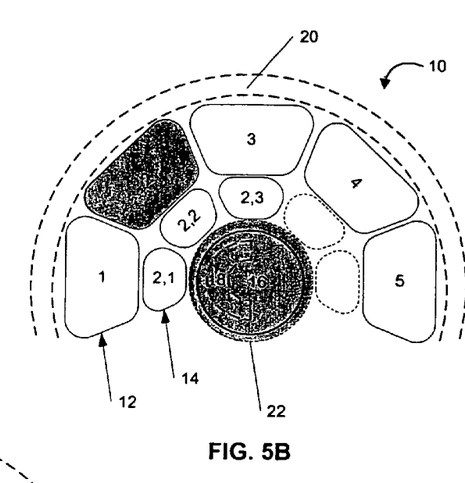

Turning to FIG. 5B, selected element 2 of top-level 12 has three sub-elements (2,1-2,3) respectively, as also shown in FIG. 4. These three sub-elements are instantiated into the elements of sub-level 14 once element 2 of top-level 12 is selected.

Figure 5C:
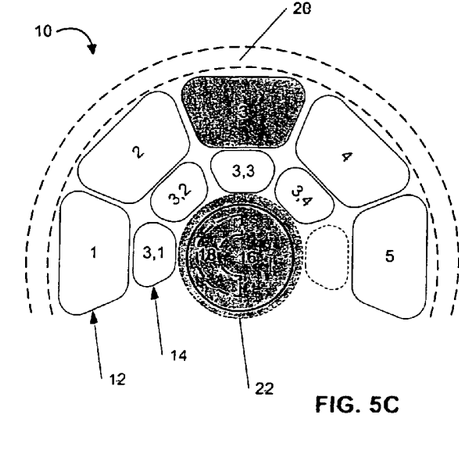

Similarly, with respect to FIG. 5C, selected element 3 of top-level 12 has four sub-elements (3,1-3,4) respectively, as also shown in FIG. 4. These four sub-elements are instantiated into the elements of sub-level 14 once element 3 of top-level 12 is selected. Also illustrated in FIGS. 5B and 5C are potential additional elements of sub-level 14. Although the illustrated embodiments show a total of only five elements of sub-level 14, there can be any number of additional or fewer elements. For example, additional elements can be added to sub-level 14 by decreasing the size of each element contained within sub-level 14.

Figure 5D:
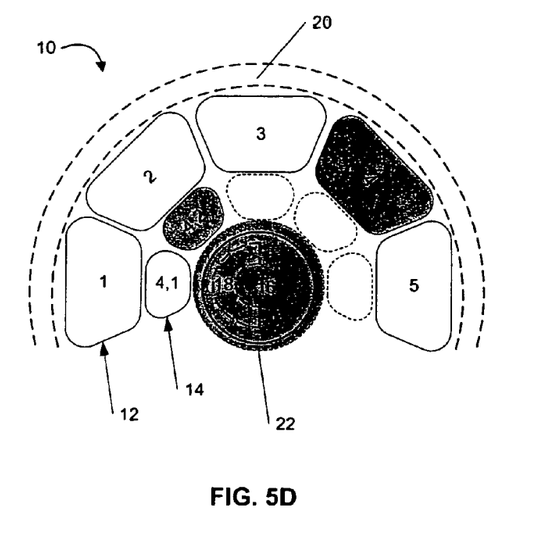

In FIG. 5D, selected element 4 of top-level 12 has two sub-elements (4,1-4,2) respectively, as also shown in FIG. 4. These two sub-elements are instantiated into the elements of sub-level 14 once element 4 of top-level 12 is selected. Additionally, in the illustrated embodiment, element 4,2 of sub-level 14 is selected. Advantageously, selection of this element of sub-level 14 causes any description in text display area 20, any graphics in graphics display area 22, and any associated audio to be updated according to the new selection.

Figure 5E:
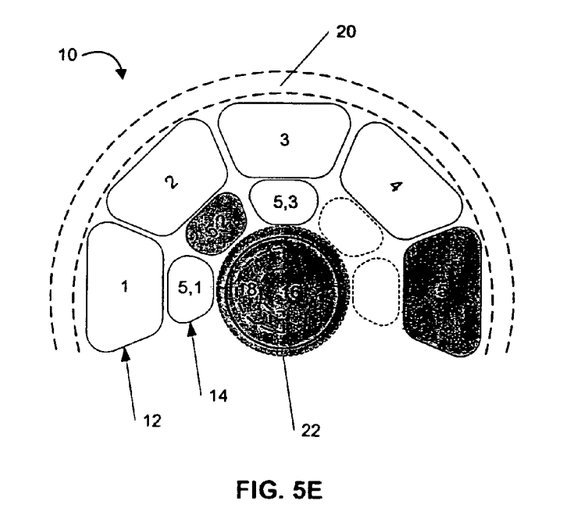

Similarly, in FIG. 5E, selected element 5 of top-level 12 has three sub-elements (5,1-5,3) respectively, as also shown in FIG. 4. These three sub-elements are instantiated into the elements of sub-level 14 once element 5 of top-level 12 is selected. Additionally, in the illustrated embodiment, element 5,2 of sub-level 14 is selected. Advantageously, selection of this element of sub-level 14 causes any description in text display area 20, any graphics in graphics display area 22, and any associated audio to be updated according to the new selection.

Figure 6:
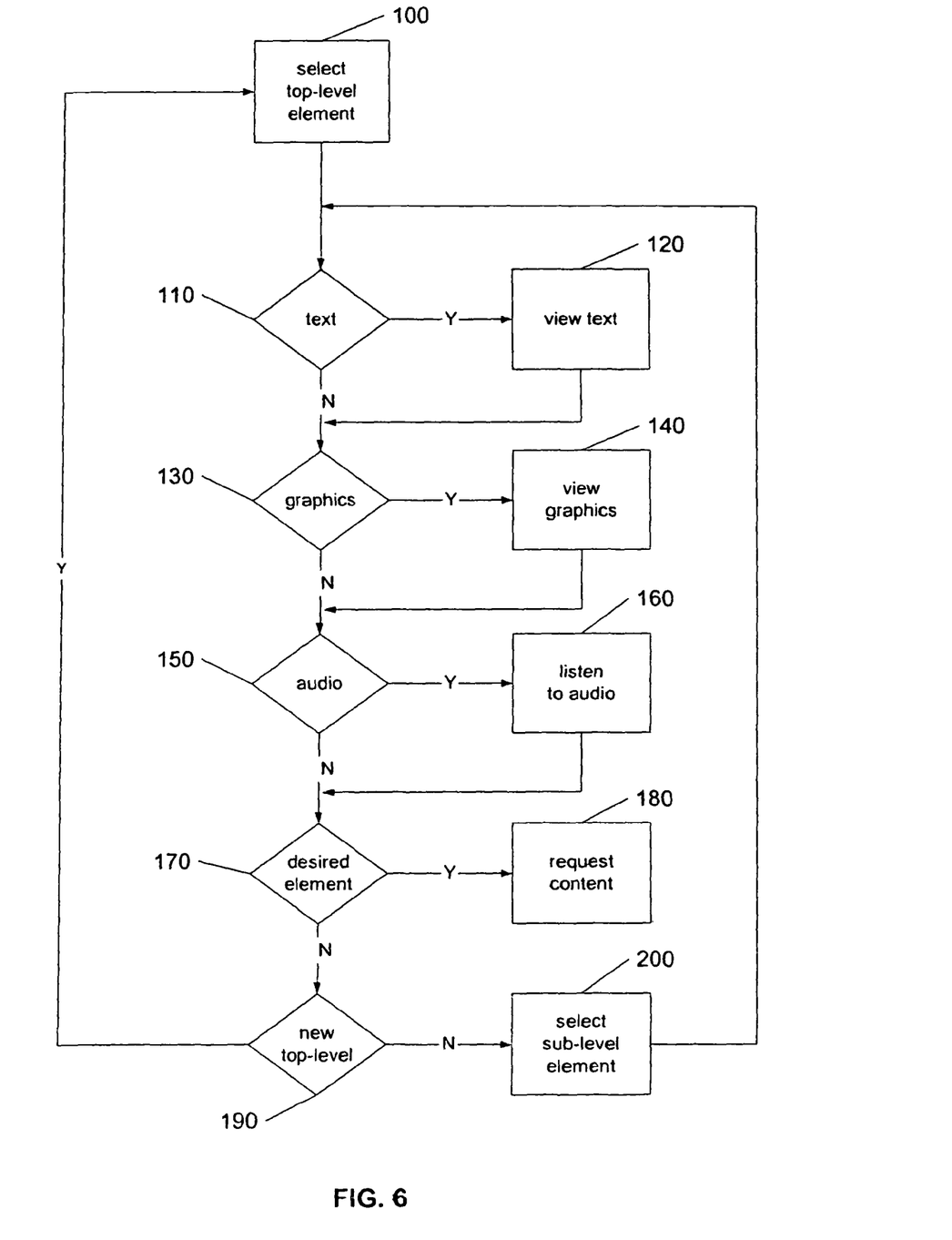
FIG. 6 is a flow diagram illustrating an example user process for navigating a dynamic collection of information according to an embodiment of the present invention.

FIG. 6 is a flow diagram illustrating an example user process for navigating a dynamic collection of information according to an embodiment of the present invention. Initially, a user selects a top level element presented in the navigation system, as shown in step 100. The selection of an element in the navigation system may be carried out by a variety of means, including a mouse-over event, a mouse click event, depressing a button on a keypad, touching the appropriate area on a touch screen interface device, speaking an oral command (in conjunction with a speech recognition system), or by the use of a wand device (e.g., with a PDA), just to name a few.

Once the user has selected a top-level element, the navigation system updates to convey to the user the content available within the selected element. If there is new text associated with the selection, as illustrated in step 110, the user views that text in the text display area, as shown in step 120. The text may be presented in a scrolling, flashing, or otherwise conspicuous manner to grab the attention of the user.

If there are new graphics associated with the selection, as illustrated in step 130, the user views the new graphics in the graphics display area, as shown in step 140. The graphics may be presented as static images or as moving video. Additionally, a single static image may be presented or a group of static images may be presented in sequence such that the images are cycled on a periodic basis (with variable or even display times). Advantageously, moving video or cycling through a series of static images effectively catches the attention of the user.

In addition to text and graphics, if there is audio associated with the selection, as illustrated in step 150, the user listens to the audio from speakers that are coupled with the navigation system, as shown in step 160. The audio may be presented as a brief sound byte, or as a continuous, possibly looping stream of audio. In one embodiment, the audio may emphasize the text being displayed by speaking the words that are displayed in the text area. Alternatively, the audio may emphasize the graphics being displayed in the graphics display area by serving as a sound track for moving video or cycling static images. Additionally, the audio may complement both the text and the graphics.

Advantageously, text, graphics, and audio can be combined and choreographed to work in concert and efficiently convey to the user what content is available within the selected element.

Once the navigation system has been updated and the user has viewed the new text and graphics and listened to any new audio, the user makes a determination whether the desired element has been selected, as illustrated in step 170. If the desired element has been selected, the user then requests the content, as shown in step 180. Requesting the content associated with an element may be carried out by various means, including a mouse-click event (or double-click), depressing a button on a keypad, touching the appropriate area on a touch screen interface device, speaking an oral command (in conjunction with a speech recognition system), or by the use of a wand device (e.g., with a PDA), just to name a few. The content itself may be a file, a directory, a database record, or a web page.

If the desired element has not been selected, referring back to step 170, the user determines whether a new top level element is desired, as shown in step 190. If a new top-level element is desired, the process loops back and the user begins anew and selects another top level element, as illustrated in step 100. If the user is satisfied with the top-level element, but the desired element has not been found, then the user selects a sub-level element, as shown in step 200. Advantageously, sub-level elements can refine the content associated with a top-level element in order to allow the user to narrow the scope of the content prior to making a request for the content.

One particular advantage of this approach is to reduce the bandwidth required when a user navigates through a large collection of information. For example, in a wireless networking environment, where bandwidth is at a premium, the inventive navigation system is much more desirable for both users and network providers.

Once the user has selected a sub-level element, referring back to step 200, the process loops back to step 110 and begins again by providing any new text, graphics, and audio associated with the newly selected element.

Figure 7:
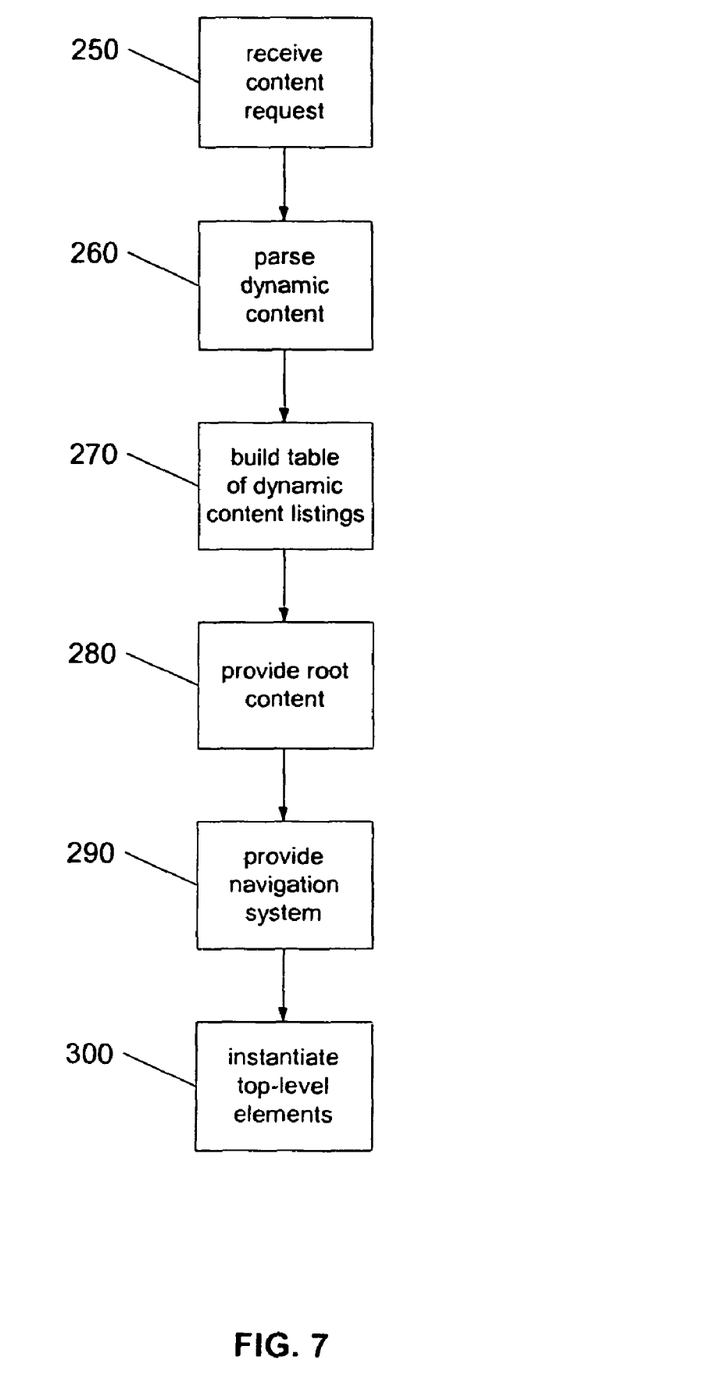
FIG. 7 is a flow diagram illustrating an example process for initializing a navigation wheel according to an embodiment of the present invention.

FIG. 7 is a flow diagram illustrating an example information server process for initializing a navigation wheel according to an embodiment of the present invention. First, in step 250, the server receives an initial content request. This initial content request may be a request for a file, a request for a database record, or a request for a web page. Upon receiving the initial request, the server examines the dynamic collection of information to determine its hierarchical structure. For example, the server may parse the dynamic collection of information, as shown in step 260. The server then builds a table of dynamic content listings, as illustrated in step 270.

The table (previously described with respect to FIG. 4) preferably reflects the hierarchical structure of the dynamic collection of information. For example, the table may be, in one representation, viewed as a tree structure. However, for ease of description, the hierarchical representation of the collection of information will be referred to herein as a table. Once the table has been constructed, the server provides the root content to the requesting user, as illustrated in step 280. The root content may comprise the main page of a web site, the root level (or desktop) view of a file system, or the top level view of a database. Alternatively, the root content may be provided immediately after receiving the content request. Additionally, the step of providing the root content may be carried out contemporaneously with the steps of parsing the dynamic content and building the table of dynamic content listings.

After providing the root content to the requesting user, the server next provides the navigation system, as shown in step 290. The navigation system, similar to the root content, is presented to the user once it has been provided. In one embodiment, the navigation system may be presented as an overlay on the viewing device (e.g. monitor, PDA screen) in use. The overlay may be resident in a particular application window, for example when the navigation system is being used with a database application or a web browser. Alternatively, the overlay may be resident on the computer desktop when the navigation system is being used with a file system.

Advantageously, when the navigation system is being used with an application, the presentation of the navigation system can be implemented as an overlay such that the content within the application window can be viewed beneath the navigation system. Furthermore, when the underlying application window is scrolled, the navigation system preferably remains fixed within the application window, floating above the content within the application window.

Once the navigation system has been provided, the server instantiates the top-level elements, as shown in step 300. Referring back to FIG. 4, the top-level elements are those elements that are in the top row of the dynamic content table. For example, the top-level elements can be the links from the main page of a web site or the available disk drives on a computer system. These top-level content elements are instantiated into the navigation system so that a top-level element can be selected by the user. At this point, the server may also provide any text, graphics, or audio to be associated with the base navigation system.

Figure 8:
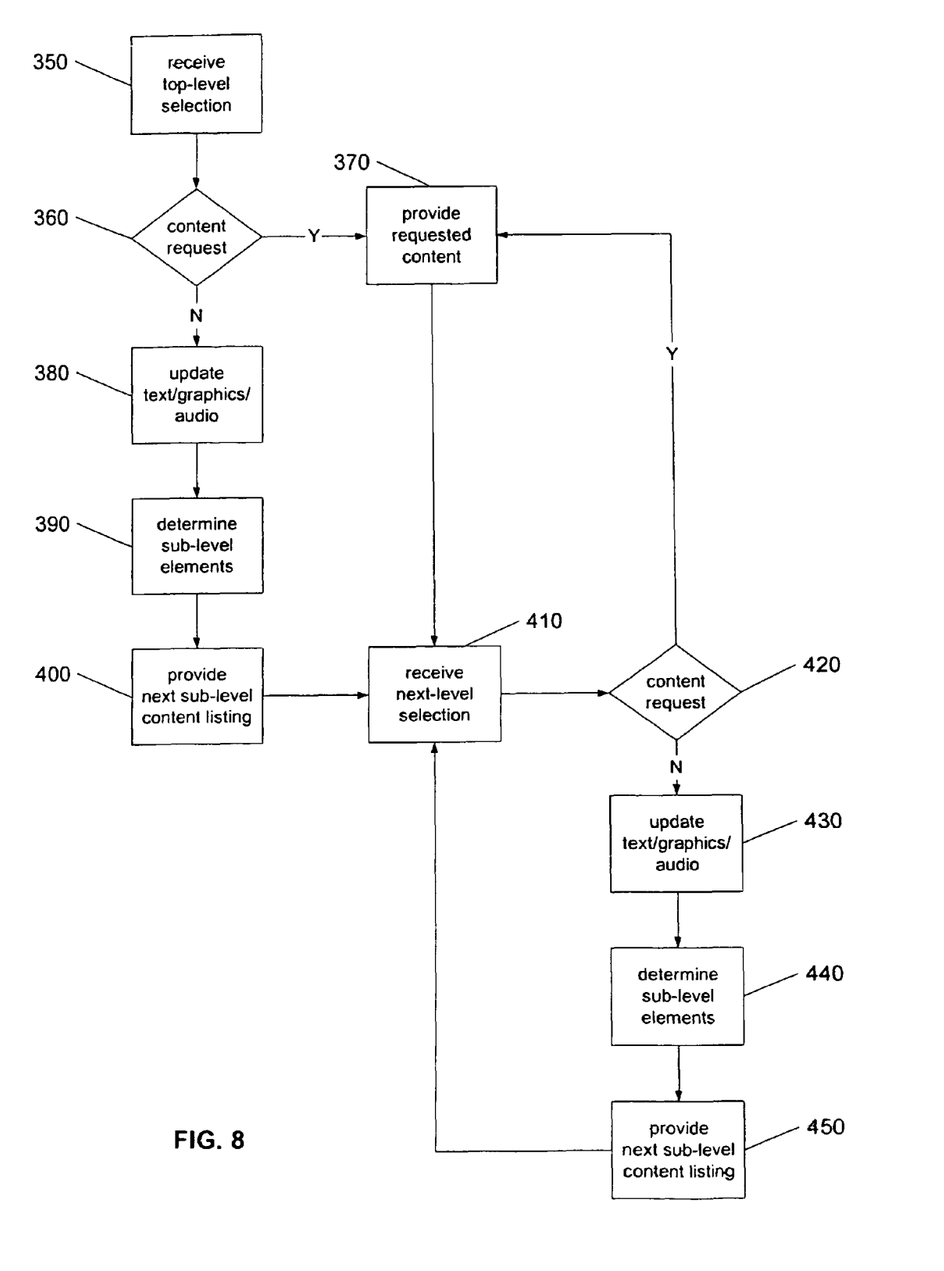
FIG. 8 is a flow diagram illustrating an example server process for navigating a dynamic collection of information according to an embodiment of the present invention.

FIG. 8 is a flow diagram illustrating an example server process for navigating a dynamic collection of information according to an embodiment of the present invention. Initially, the server receives a top-level selection from the user, as illustrated in step 350. The selection may be received via conventional inter-process communication ("IPC") in an embodiment where the navigation system is resident on a single device. Alternatively, the selection may be received via a network communication in an embodiment where the navigation system resides on a centralized server.

Once the server receives the selection, it examines the selection to determine if a top-level element has been selected or if top-level content has been selected, as shown in step 360. If the request is for top-level content, the content is provided, as shown in step 370. The content may comprise a file, a database record, a web page, or some combination of these and other types of content. Once the requested content has been provided, the server waits to receive the next-level selection, as shown in step 410.

If the request is a selection of a top-level element, the server next provides any new text, graphics, or audio that is associated with the newly selected element, as illustrated in step 380. Additionally, the server determines what sub-level elements are associated with the selected top-level element and instantiates those sub-level elements into the navigation system, as shown in steps 390 and 400.

Once the text, graphics, audio, and sub-level elements have been provided to and instantiated in the navigation system, the server waits until it receives the next-level selection, as illustrated in step 410. The next-level may be another top-level selection or it may be a sub-level selection. Additionally, the next-level selection may be a content request or a selection of an element in the next-level (i.e., top-level or sub-level). The server examines the request to determine the type of request, as shown in step 420. If the request is a content request, the server provides the requested content, as shown in step 370. Once the requested content has been provided, the server waits to receive the next-level selection, as shown in step 410.

If the request is a selection of a next-level element, the server then provides any new text, graphics, or audio that is associated with the newly selected element, as illustrated in step 430. Additionally, the server determines what sub-level elements are associated with the selected next-level element and instantiates those sub-level elements into the navigation system, as shown in steps 440 and 450. Once the text, graphics, audio, and sub-level elements have been provided to and instantiated in the navigation system, the process loops back and the server waits until it receives the next-level selection, as shown in step 410.

Figure 9A:
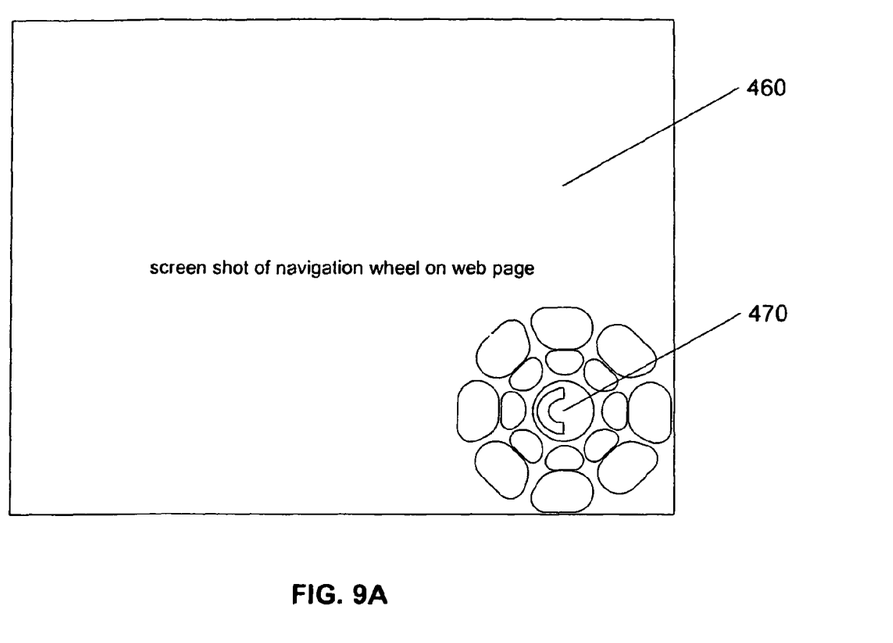
FIG. 9A is a screen shot illustrating an example application window incorporating a navigation wheel according to an embodiment of the present invention.

FIG. 9A is a screen shot illustrating an example application window 460 incorporating a navigation wheel 470 according to an embodiment of the present invention. In the illustrated embodiment, a web browser application window 460 is shown. The navigation wheel 470 is placed at the lower right hand corner of the application window 460, superimposed over the content in the application window 460. Preferably, as the content in the application window 460 is scrolled up and down, the navigation wheel 470 remains fixed in the lower right hand corner, effectively floating over the scrolling content in the application window 460. The location of the navigation wheel 470 in the application window 460 can vary. For example, the navigation wheel 470 may be placed in the upper or lower portion of the window 460 or in the right hand or left hand portion of the window 460.

Figure 9B:
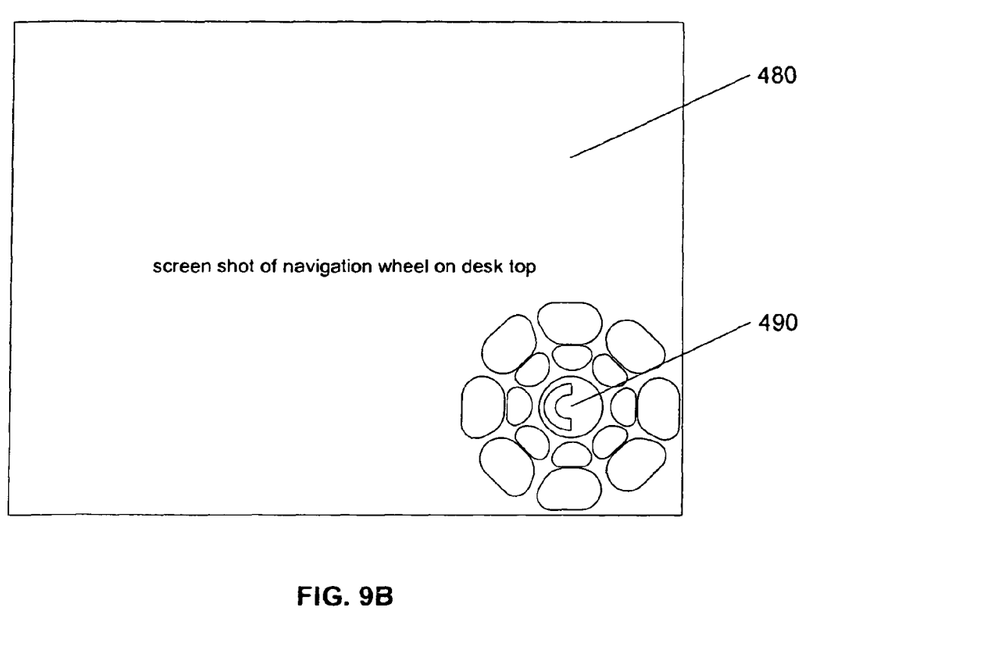
FIG. 9B is a screen shot illustrating an example computer desktop incorporating a navigation wheel according to an embodiment of the present invention.

FIG. 9B is a screen shot illustrating an example computer desktop 480 incorporating a navigation wheel 490 according to an embodiment of the present invention. In the illustrated embodiment, a the computer desktop 460 is shown as a computer running the Microsoft® Windows® operating system. Alternative operating systems such as MacOS®, Linux, UNIX, or others may also be the underlying engine for the computer desktop 480.

The navigation wheel 490 is placed at the lower right hand corner of the computer desktop 480, superimposed over any application windows on the desktop 480. Preferably, as application windows on the computer desktop 480 appear, disappear, and move around the desktop 480, the navigation wheel 490 remains fixed in the lower right hand corner, effectively floating over any application windows on the desktop 480. The location of the navigation wheel 490 on the computer desktop 480 can vary. For example, the navigation wheel 490 may be placed in the upper or lower portion of the computer desktop 480 or in the right hand or left hand portion of the computer desktop 480.

Figure 10:
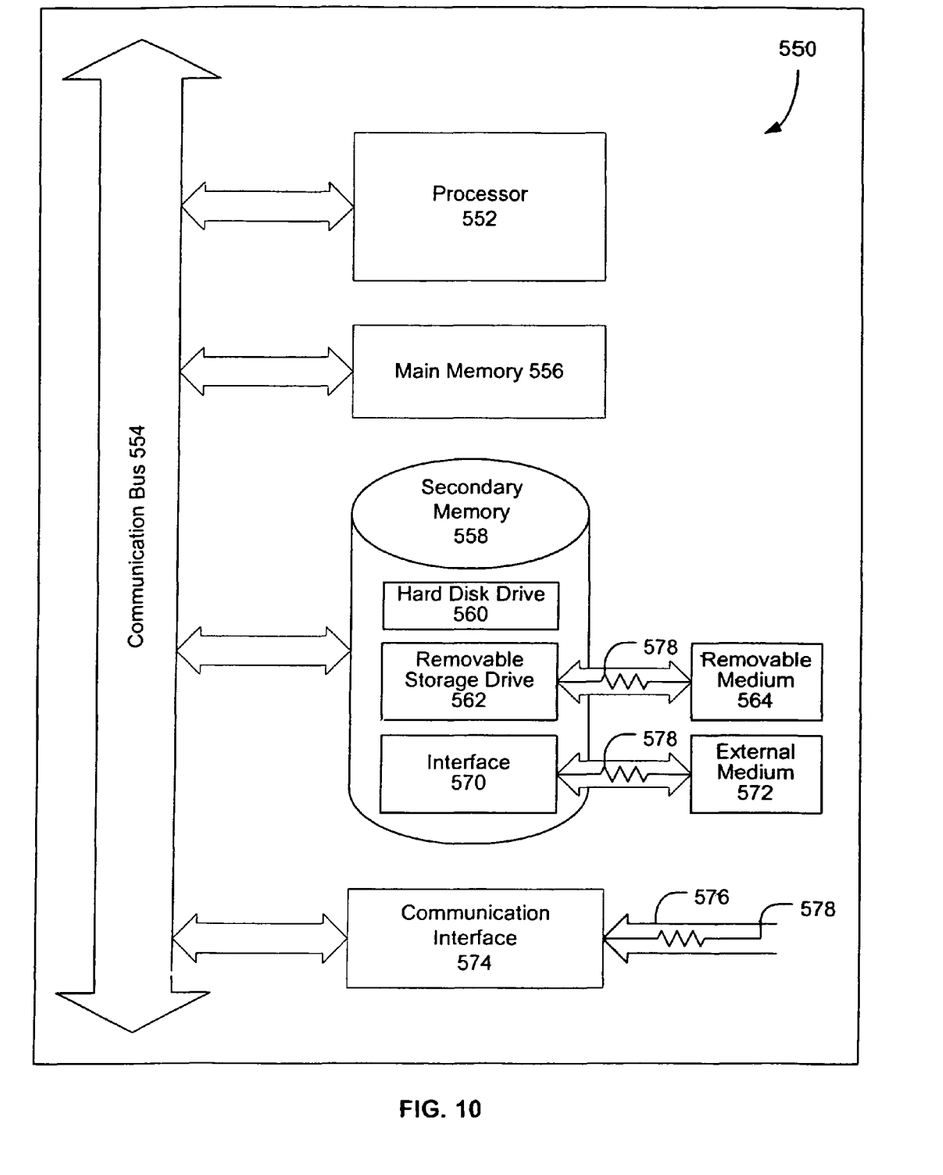
FIG. 10 is a block diagram illustrating an exemplary computer system as may be used in connection with various embodiments described herein.

FIG. 10 is a block diagram illustrating an exemplary computer system 550 that may be used in connection with the various embodiments described herein. For example, the computer system 550 may be used in conjunction with a conventional personal computer ("PC"), notebook computer, laptop computer, personal digital assistant ("PDA"), network terminal, database terminal, automatic teller machine ("ATM"), wireless communication device, and the like. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The retain memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external bard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows softwar-e and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an iEEE 1394 firewire, just to name a few.

Communication interface 574 preferably implements industry promulgated protocol standards, such as Ethernet IEEE 802 standards, Fibre Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/ point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) are stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent those skilled in the relevant art. Various embodiments may also be implemented using a combination of both hardware and software.

While the particular systems and methods for navigating a dynamic collection of information herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method, comprising:
 presenting an information hierarchy of information content on a main display to a user, said information hierarchy including a set of selectable top-level elements, and a dynamically-varying set of selectable mid-level elements, wherein said presenting comprises dynamically creating the dynamically-varying set of selectable mid-level elements based on a selection of one of said top level elements, said dynamically creating creates and presents a first set of mid-level elements responsive to selection of a first top level element, and presents and creates a second set of mid level elements responsive to selection of a second top level element;
 on a computer, receiving a selection of one of said top-level elements;
 responsive to said selection of said one of said top level elements, said computer using a database of information to obtain new information and changing the set of said dynamically-varying mid-level elements that are displayed based on said using database;
 said computer enabling selection of any of the displayed mid-level elements as a selected element, and presenting all of text, graphics, and audio in combination to represent a content associated with said selected element, said text, graphics and audio being indicative of content associated with said a selected element, where said content is separately requested from said selection, wherein said text, graphics, and audio that is presented is different for each of a plurality of said dynamically-varying mid level elements, and where said text, graphics and audio is different than said content when requested, but said text, graphics and audio are related to the content for a selection,
 changing records in the database of information to change said all of said text, graphics, and audio which are presented to indicate a particular element so that said all of text, graphics, and audio that is presented is first all of text, graphics, and audio at a first time, and second different all of text, graphics, and audio at a second time;
 wherein said top-level elements, said mid-level elements and a displaying element are concentrically arranged with each element surrounding an inner element, wherein said top-level elements form an outer ring, said mid-level elements form a middle ring, and said selection display forms a center ring and displaying an additional ring outside said outer ring with text thereon; and
 wherein said information content includes all of files and databases and webpages.

2. A method as in claim 1, wherein said presenting information displays at least one static image.

3. A method as in claim 1, wherein said receiving a selection comprises selecting with a personal digital assistant wand.

4. A method as in claim 1, further comprising storing a table representing a relationship between a specific selected top-level element, and those of said mid-level elements associated with said specific selected top-level element.

5. A method as in claim 4, wherein said changing the set of said mid-level elements comprises using the table to determine which of the mid-level elements are displayed based on the top-level element that is displayed.

6. A method as in claim 5, wherein said using the table comprises using the table to determine a graphic part associated with the elements.

7. A computer with a user interface, comprising:
 a display, having a display part which displays information;
 a processor, producing a user interface display and coupling said user interface display to said display, and which accepts an actuation of an item in said user interface display, and selects an object based on said actuation, and wherein said user interface display produced by said processor includes a first portion of top-level elements, each of which represent a first level view of multimedia items that can be viewed, and a second portion of mid-level elements each of which mid level elements represent a second level view of multimedia items that can be viewed, wherein said mid-level elements that are displayed is based on which of the top-level elements is selected so that a first set of mid-level elements is shown for a first top level element, and a second set of mid level elements is shown for a second top level element, and wherein said mid-level elements are dynamically created at a time when said top-level element is selected, and wherein selecting a mid level element provides a first view of said multimedia items, said first view includes all of text, graphics and audio in combination to represent a multimedia item prior to the user requesting content indicated by said multimedia item, and wherein said user interface display further includes a selection display portion that produces an output based on requesting at least one of said top-level elements or at least one of said mid-level elements, and where said processor controls said selection display portion to display at least one item indicative of multimedia associated with a selected element responsive to requesting content indicative of the selected element, and said at least one item of multimedia information is different than the text, graphics and audio that represents said selection, and is different for each selected element, and is based on the selection of the selected element;

wherein said user interface display includes first, second and third concentric rings of display elements, wherein said first ring include said top-level elements, said second ring includes said mid-level elements, and said third ring includes said selection display portion, wherein said top-level element forms an outer ring, said mid-level element forms a mid ring, and said display element forms a center ring;

said user interface display further includes an additional ring displayed outside said outer ring with text thereon, and wherein said content includes all of files and databases and webpages.

8. A computer as in claim 7, further comprising a memory storing a table which includes information indicative of a hierarchy of said user interface, wherein said table includes information indicative of plural mid-level elements that are associated with each of said top-level elements; and at least one graphic element that is associated with at least one other element.

* * * * *